United States Patent
Li et al.

(10) Patent No.: US 11,991,460 B2
(45) Date of Patent: May 21, 2024

(54) CAMERA SYSTEM AND DATA TRANSMISSION METHOD THEREFOR, DISPLAY SCREEN, AND ELECTRONIC DEVICES

(71) Applicant: BOE TECHNOLOGY GROUP CO., LTD., Beijing (CN)

(72) Inventors: Yangbing Li, Beijing (CN); Xiaoliang Ding, Beijing (CN); Pengpeng Wang, Beijing (CN); Fangyuan Zhao, Beijing (CN); Yapeng Li, Beijing (CN); Wenjuan Wang, Beijing (CN); Yingming Liu, Beijing (CN); Lei Wang, Beijing (CN); Yichi Zhang, Beijing (CN); Tianyang Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 17/911,150

(22) PCT Filed: Aug. 5, 2021

(86) PCT No.: PCT/CN2021/110696
§ 371 (c)(1),
(2) Date: Sep. 13, 2022

(87) PCT Pub. No.: WO2022/057489
PCT Pub. Date: Mar. 24, 2022

(65) Prior Publication Data
US 2023/0107692 A1 Apr. 6, 2023

(30) Foreign Application Priority Data

Sep. 17, 2020 (CN) .......................... 202010983821.7

(51) Int. Cl.
*H04N 23/90* (2023.01)
*H04L 25/02* (2006.01)
(Continued)

(52) U.S. Cl.
CPC ........... *H04N 23/90* (2023.01); *H04L 25/027* (2013.01); *H04N 7/181* (2013.01); *H04N 23/66* (2023.01);
(Continued)

(58) Field of Classification Search
CPC ...... H04N 23/90; H04N 23/66; H04N 23/957; H04N 23/73; H04N 23/60; H04N 23/665;
(Continued)

(56) References Cited

U.S. PATENT DOCUMENTS 6,188,431 B1 * 2/2001 Oie .................... H04N 1/32566
348/14.14
7,136,094 B2 * 11/2006 Ziemkowski .......... H04N 23/66
348/207.99
(Continued)

FOREIGN PATENT DOCUMENTS

CN 202535463 U 11/2012
CN 203482320 U 3/2014
(Continued)

OTHER PUBLICATIONS

International Search Report (w/ English translation) and Written Opinion for corresponding PCT Application No. PCT/CN2021/110696, dated Oct. 26, 202, 8 pages.
(Continued)

*Primary Examiner* — Pritham D Prabhakher
(74) *Attorney, Agent, or Firm* — Dority & Manning, PA

(57) ABSTRACT

A camera system comprises: a main control chip, wherein the main control chip includes at least one main control unit; at least one group of cameras, wherein each camera in each
(Continued)

group of cameras includes an image acquisition control chip; and at least one pair of bidirectional differential data lines, wherein each pair of bidirectional differential data lines is connected to a single main control unit and all image acquisition control chips in a single group of cameras.

19 Claims, 7 Drawing Sheets

(51) Int. Cl.
  *H04N 7/18* (2006.01)
  *H04N 23/60* (2023.01)
  *H04N 23/66* (2023.01)
  *H04N 23/73* (2023.01)
  *H04N 23/957* (2023.01)

(52) U.S. Cl.
  CPC ........... *H04N 23/665* (2023.01); *H04N 23/73* (2023.01); *H04N 23/957* (2023.01)

(58) Field of Classification Search
  CPC ... H04N 7/181; H04N 25/027; G06F 13/4295
  USPC ....................................................... 348/211.1
  See application file for complete search history.

(56) References Cited

U.S. PATENT DOCUMENTS

| | | | | |
|---|---|---|---|---|
| 7,362,353 | B2* | 4/2008 | Kikuchi | H04N 23/663 |
| | | | | 348/207.99 |
| 7,787,043 | B2* | 8/2010 | Moriya | G03B 17/14 |
| | | | | 348/335 |
| 8,713,598 | B2* | 4/2014 | Nakajima | H04N 5/775 |
| | | | | 725/52 |
| 9,439,349 | B2* | 9/2016 | Drake | A01D 34/006 |
| 10,057,544 | B2* | 8/2018 | Ihlenburg | H04N 7/18 |
| 10,628,339 | B2* | 4/2020 | Herrmann | G06F 13/1605 |
| 10,630,940 | B2* | 4/2020 | Ihlenburg | H04N 7/18 |
| 11,100,844 | B2* | 8/2021 | He | G09G 3/2003 |
| 11,231,805 | B2* | 1/2022 | Guo | G06F 3/0416 |
| 11,252,376 | B2* | 2/2022 | Ihlenburg | H04N 7/18 |
| 11,257,439 | B2* | 2/2022 | Guo | G09G 3/3685 |
| 11,380,107 | B2* | 7/2022 | Bauer | H04L 12/422 |
| 11,568,833 | B2* | 1/2023 | Wang | G09G 3/20 |
| 2009/0089850 | A1 | 4/2009 | Nakajima et al. | |
| 2014/0247355 | A1* | 9/2014 | Ihlenburg | H04N 7/18 |
| | | | | 348/148 |
| 2016/0006102 | A1 | 1/2016 | Park et al. | |
| 2017/0272491 | A1* | 9/2017 | Ortiz | H04L 67/1095 |
| 2019/0007653 | A1* | 1/2019 | Ihlenburg | H04N 7/18 |
| 2019/0057046 | A1* | 2/2019 | Herrmann | H04N 21/4331 |
| 2019/0057051 | A1* | 2/2019 | Herrmann | H04N 7/18 |
| 2019/0333443 | A1 | 10/2019 | He et al. | |
| 2020/0125858 | A1* | 4/2020 | Bauer | H04L 12/40189 |
| 2020/0257399 | A1 | 8/2020 | Guo et al. | |
| 2021/0174749 | A1 | 6/2021 | Guo et al. | |
| 2021/0193078 | A1 | 6/2021 | Wang et al. | |

FOREIGN PATENT DOCUMENTS

| | | |
|---|---|---|
| CN | 204859330 U | 12/2015 |
| CN | 107087105 A | 8/2017 |
| CN | 108112162 A | 6/2018 |
| CN | 108712625 A | 10/2018 |
| CN | 210093340 U | 2/2020 |
| JP | 2008211377 A | 9/2008 |
| JP | 2009021959 A | 1/2009 |
| JP | 2009290259 A | 12/2009 |

OTHER PUBLICATIONS

Chinese Office Action (w/ English translation) for corresponding Application No. 202010983821.7, dated Jul. 5, 2022, 21 pages.
Cang Yue, Codes (NRZ, NRZI, Manchester 4B/5B) (w/ English translation), cnblogs.com, Mar. 9, 2016, 5 pages.
"Microstrip differential lines and ribbon differential lines" (w/ English translation), 4 pages.
International Search Report (w/ English translation) and Written Opinion for corresponding PCT Application No. PCT/CN2021/110696, dated Oct. 26, 2021, 8 pages.

* cited by examiner

CAMERA SYSTEM AND DATA TRANSMISSION METHOD THEREFOR, DISPLAY SCREEN, AND ELECTRONIC DEVICES

CROSS-REFERENCE TO RELATED APPLICATIONS

This application is a national phase entry under 35 USC 371 of International Patent Application No. PCT/CN2021/110696, filed on Aug. 5, 2021, which claims priority to Chinese Patent Application No. 202010983821.7, filed on Sep. 17, 2020, which are incorporated herein by reference in their entirety.

TECHNICAL FIELD

The present disclosure relates to the field of optical imaging, and in particular, to a camera system and a data transmission method therefor, a display screen, and electronic devices.

BACKGROUND

At present, in order to achieve a good optical imaging effect, a camera array is usually used to realize collection of a light field. However, since a single camera in the camera array requires a large number of wire harnesses to be led out, it is difficult for the camera array to meet the requirement of high integration.

The camera array may be integrated into an electronic device. However, since it is difficult for the camera array to meet the requirement of high integration, there is a limit to the number of cameras that can be arranged in a unit area of the electronic device. In addition, in a case where the electronic device is a display device, the electronic device further includes a display screen. However, the display screen and the camera array in the electronic device are separately provided, resulting in a low integration level.

SUMMARY

In an aspect, a camera system is provided. The camera system includes a main control chip, at least one group of cameras, and at least one pair of bidirectional differential data lines. The main control chip includes at least one main control unit. Each camera in each group of cameras includes an image acquisition control chip. Each pair of bidirectional differential data lines is connected to a single main control unit and all image acquisition control chips in a single group of cameras.

In some embodiments, the image acquisition control chip includes a first pin and a second pin, each main control unit includes another first pin and another second pin. Each pair of bidirectional differential data lines includes: a first data line connected to a first pin of the single main control unit and first pins of all the image acquisition control chips in the single group of the cameras corresponding to the main control unit, and a second data line connected to a second pin of the single main control unit and second pins of all the image acquisition control chips in the single group of the cameras corresponding to the main control unit.

In some embodiments, the camera further includes a lens. The image acquisition control chip further includes: an analog acquirer located on a light-exit side of the lens, the analog acquirer being configured to acquire an analog image signal corresponding to the lens and convert the analog image signal into a digital image signal; a first memory coupled to the analog acquirer, the first memory being configured to store the digital image signal; and a digital interface device and a clock device, the digital interface device being coupled to the analog acquirer, the first memory, the clock device, and both the first pin and the second pin of the image acquisition control chip, and the clock device being configured to provide working clocks for the analog acquirer, the first memory and the digital interface device.

In some embodiments, the image acquisition control chip further includes: a third pin configured to be connected to an external power supply; a fourth pin being grounded; and a power management device coupled to the third pin and the fourth pin, the power management device being configured to provide a working power for the analog acquirer, the first memory, the digital interface device and the clock device.

In some embodiments, the camera system further includes a substrate on which the at least one pair of bidirectional differential data lines is laid. Characteristic impedance of each pair of bidirectional differential data lines on the substrate ranges from 98Ω to 102Ω, inclusive.

In some embodiments, the main control chip includes M main control units, the camera system includes M groups of cameras in one-to-one correspondence with the M main control units, and each group of the cameras includes N cameras. M is an integer greater than or equal to 2, and N is an integer greater than or equal to 2.

In some embodiments, the M groups of cameras are arranged in a first direction, and the N cameras in each group of cameras are arranged in a second direction intersecting the first direction.

In some embodiments, the M main control units are sequentially numbered as 1 to M, and cameras in a group connected to each main control unit are sequentially numbered as 1 to N. An identification number of each camera is a combination of numbers of a respective main control unit and the camera.

In some embodiments, the main control chip is a field programmable gate array (FPGA) chip or an application specific integrated circuit (ASIC) chip; and the image acquisition control chip is another FPGA chip or another ASIC chip.

In some embodiments, the main control chip further includes a second memory coupled to the at least one main control unit, and a peripheral interface coupled to the second memory.

In some embodiments, each main control unit is configured to: poll online states of cameras in a group connected to the main control chip to generate a camera online list; send initial parameter information to each camera connected to the main control chip and located in the camera online list; receive configuration completion information sent by each camera in the camera online list; send exposure control information to each camera connected to the main control chip and completing initial parameter configuration; send image request information to each camera connected to the main control chip and completing exposure; and receive image information sent by each camera completing the exposure and located in the camera online list.

In some embodiments, an image acquisition control chip of a camera is configured to: receive initial parameter information sent by a main control unit connected to the camera; perform initial parameter configuration according to the initial parameter information; send configuration completion information to the main control unit connected to the camera after completion of the initial parameter configuration; receive exposure control information sent by the main control unit connected to the camera; perform exposure based on the exposure control information to generate image information; receive image request information sent by the main control unit connected to the camera; and send the image information to the main control unit connected to the camera based on the image request information.

In another aspect, a display screen is provided. The display screen has a display area and a non-display area located on at least one side of the display area. The display screen includes the camera system according to any of the above embodiments. The main control chip in the camera system is located in the non-display area, and the at least one group of cameras in the camera system is located in the display area.

In yet another aspect, an electronic device is provided. The electronic device includes the camera system according to any of the above embodiments, or the display screen according to any of the above embodiments.

In yet another aspect, a data transmission method is provided, which is applied to the camera system according to any of the above embodiments. The data transmission method includes:

in a initialization period: polling, by each main control unit of the main control chip, online states of cameras in a group connected thereto to generate a camera online list; sending, by each main control unit of the main control chip, initial parameter information to each camera connected thereto and located in the camera online list; performing, by each camera in the camera online list, initial parameter configuration according to the initial parameter information, and sending, by each camera in the camera online list, configuration completion information to a main control unit connected thereto after the completion of the initial parameter configuration;

in an exposure period: sending, by each main control unit of the main control chip, exposure control information to each camera connected thereto and completing the initial parameter configuration; and performing, by each camera completing the initial parameter configuration and located in the camera online list, exposure based on the exposure control information, so as to generate image information; and in an image transmission period: sending, by each main control unit of the main control chip, image request information to each camera connected thereto and completing the exposure; and sending, by each camera completing the exposure and located in the camera online list, the image information to the main control unit connected thereto based on the image request information.

In some embodiments, sending the initial parameter information includes: sending a camera parameter configuration data packet including the initial parameter information; sending the configuration completion information includes: sending a camera configuration response data packet including the configuration completion information; sending the exposure control information includes: sending a broadcast exposure data packet including the exposure control information; sending the image request information includes: sending an image information request data packet including the image request information; sending the image information includes: sending an image information transmission data packet including the image information. At least one of the camera parameter configuration data packet, the camera configuration response data packet, the broadcast exposure data packet, the image information request data packet or the image information transmission data packet is sent after being encoded.

In some embodiments, the at least one of the camera parameter configuration data packet, the camera configuration response data packet, the broadcast exposure data packet, the image information request data packet or the image information transmission data packet is sent after being encoded in a non-return-zero inverted (NRZI) encoding manner.

In some embodiments, the at least one of the camera parameter configuration data packet, the camera configuration response data packet, the broadcast exposure data packet, the image information request data packet or the image information transmission data packet includes synchronization information.

In some embodiments, the method further includes: recovering, by each main control unit of the main control chip, a working clock of the camera sending the image information from an encoded data stream corresponding to the image information transmission data packet; and decoding, by each main control unit of the main control chip, the image information transmission data packet to obtain the image information in the camera according to the recovered working clock.

In some embodiments, decoding the image information transmission data packet to obtain the image information in the camera includes: parsing, by the main control unit of the main control chip, the decoded image information transmission data packet to obtain a parsed result, and determining, by the main control unit of the main control chip, whether the decoded image information transmission data packet is a designated data packet according to the parses result; if the decoded image information transmission data packet is the designated data packet, checking, by the main control unit of the main control chip, the decoded image information transmission data packet to obtain a check result, and determining, by the main control unit of the main control chip, whether an error code occurs in the decoded image information transmission data packet according to the check result; and if no error code occurs in the decoded image information transmission data packet, obtaining, by the main control unit of the main control chip, the image information in the camera according to the decoded image information transmission data packet.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods and actual timings of signals involved in the embodiments of the present disclosure.

DETAILED DESCRIPTION

Figure 1:
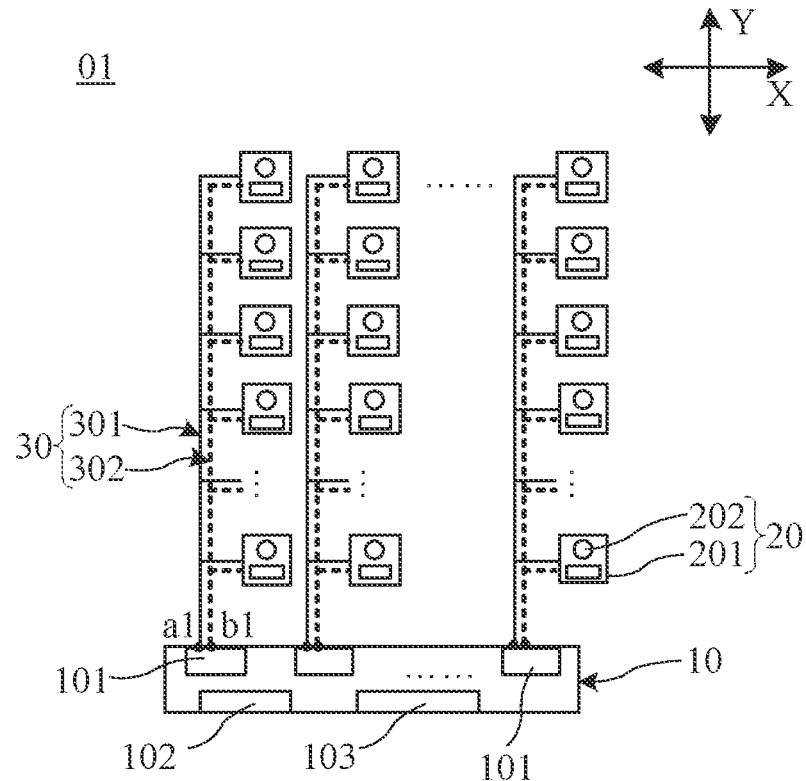
FIG. 1 is a structural diagram of a camera system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by the terms "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

In addition, the phrase "based on" as used herein indicates openness and inclusiveness, since a process, step, calculation, or other action that is "based on" one or more of the stated conditions or values may, in practice, be based on additional conditions or exceed the stated values.

As used herein, the term "about" or "approximately" includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of a measurement system).

FIG. 1 is a structural diagram of a camera system in accordance with some embodiments. As shown in FIG. 1, the camera system 01 includes a main control chip 10, at least one group of cameras 20, and at least one pair of bidirectional differential data lines 30. Each group of cameras 20 may include one or more cameras 20. For example, in the example of FIG. 1, all cameras 20 in each column are taken as a group of cameras 20.

The main control chip 10 includes at least one main control unit 101. Each camera 20 in each group of cameras 20 includes an image acquisition control chip 201. Each pair of bidirectional differential data lines 30 is connected to a single main control unit 101 and all image acquisition control chips 201 in a single group of cameras 20.

Herein, information interaction between each main control unit 101 and a corresponding group of cameras 20 may be realized only through a pair of bidirectional differential data lines 30. Thus, it may be possible to reduce the number of wire harnesses between each main control unit 101 and the corresponding group of cameras 20, and it is conducive to arranging more cameras 20 in a unit area, i.e., it is conducive to increasing an arrangement density of cameras 20 in the unit area. In turn, an image with a high resolution may be obtained. For example, each camera 20 may correspond to an acquisition range at a certain angle, and the image with the high resolution may be obtained by combining image information acquired by each camera 20. In some examples, all cameras 20 may perform exposure simultaneously to acquire images of an object to be photographed, and light field imaging may be performed by combining image information acquired by at least part of the cameras 20.

Figure 2:
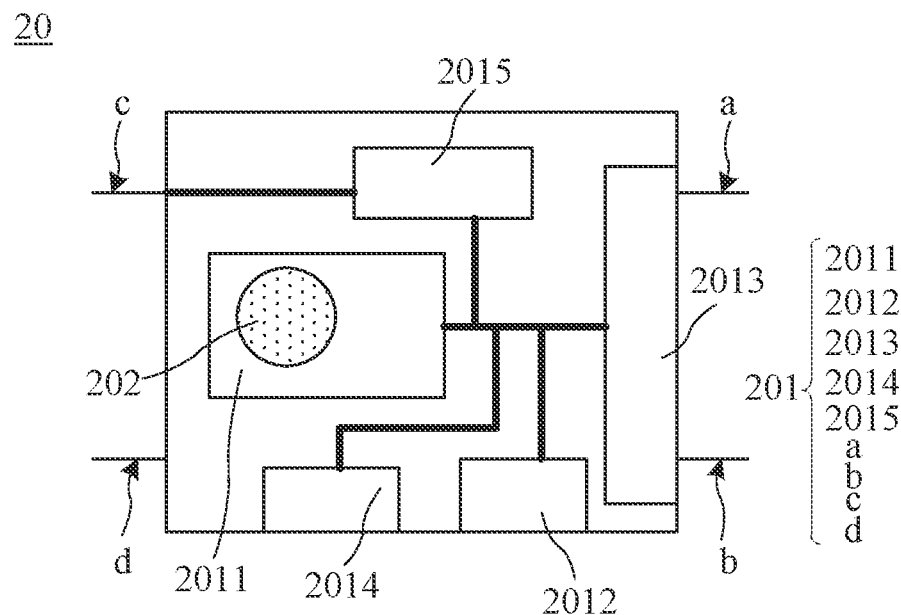
FIG. 2 is a structural diagram of an image acquisition control chip, in accordance with some embodiments.

In some embodiments, referring to FIGS. 1 and 2, the image acquisition control chip 201 includes a first pin a and a second pin b, the main control unit 101 includes a first pin a1 and a second pin b1, and each pair of bidirectional differential data lines 30 includes a first data line 301 and a second data line 302.

The first data line 301 is connected to a first pin a1 of a main control unit 101 and first pins a of all the image acquisition control chips 201 in the group of cameras 20 corresponding to the main control unit 101 (e.g., in the example of FIG. 1, all first pins a in the group of cameras 20 are connected in parallel to a corresponding first data line 301).

The second data line 302 is connected to a second pin b1 of a main control unit 101 and second pins b of all the image acquisition control chips 201 in the group of cameras 20 corresponding to the main control unit 101 (e.g., in the example of FIG. 1, all second pins b in the group of cameras 20 are connected in parallel to a corresponding second data line 302).

During the information interaction between each main control unit 101 and the corresponding group of cameras 20, the first data line 301 and the second data line 302 in each pair of bidirectional differential data lines 30 may simultaneously transmit a same signal with a phase difference of 180 degrees. For example, each main control unit 101 may simultaneously send or receive a same signal with a phase difference of 180 degrees through the first data line 301 and the second data line 302 connected to the main control unit 101, and each camera may simultaneously send or receive a same signal with a phase difference of 180 degrees through the first data line 301 and the second data line 302 connected to the camera. In this way, a double signal may be obtained, which has a strong anti-interference ability.

In some embodiments, referring to FIGS. 1 and 2, the camera 20 includes a lens 202. The image acquisition control chip 201 further includes an analog acquirer 2011, a first memory 2012, a digital interface device 2013 and a clock device 2014.

The analog acquirer 2011 is located on a light-exit side of the lens 202, and the analog acquirer 2011 may be configured to acquire an analog image signal corresponding to the lens 202, and convert the analog image signal into a digital image signal. For example, in order to improve signal quality, the analog image signal may also be amplified and then converted into the digital image signal.

The first memory 2012 is coupled to the analog acquirer 2011, and the first memory 2012 may be configured to store the digital image signal.

The digital interface device 2013 is coupled to the analog acquirer 2011, the first memory 2012, the clock device 2014, the first pin a and the second pin b. The clock device 2014 is configured to provide working clocks for the analog acquirer 2011, the first memory 2012 and the digital interface device 2013. For example, the clock device 2014 may include a crystal oscillator and a clock divider, through which working clocks required by various portions of the image acquisition control chip 201 may be generated. The digital interface device 2013 may control other components (e.g., the analog acquirer 2011, the first memory 2012 and the clock device 2014) in the image acquisition control chip 201, and the digital interface device 2013 may be connected to a pair of bidirectional differential data lines 30 through the first pin a and the second pin b, so as to realize information interaction with a corresponding main control unit 101, e.g., to realize functions such as transmission of an image signal and parsing of a transmission protocol.

In some embodiments, referring to FIG. 2, the image acquisition control chip 201 further includes a third pin c connected to an external power supply and a fourth pin d being grounded, and a power management device 2015 coupled to the third pin c and the fourth pin d. The power management device 2015 is configured to provide working power for the analog acquirer 2011, the first memory 2012, the digital interface device 2013 and the clock device 2014.

Figure 3:
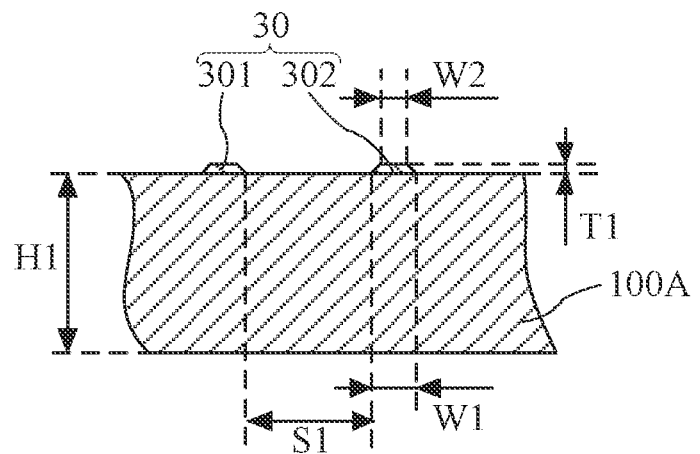
FIG. 3 is a structural diagram of a pair of bidirectional differential data lines laid on a substrate, in accordance with some embodiments.

In some embodiments, referring to FIG. 3, the camera system 01 further includes a substrate 100A, on which the at least one pair of bidirectional differential data lines 30 is laid. Characteristic impedance of each pair of bidirectional differential data lines 30 on the substrate 100A ranges from 98Ω to 102Ω, inclusive. Such a design is beneficial to improving transmission rates and qualities of signals in the bidirectional differential data lines 30.

In order to make the characteristic impedance of the bidirectional differential data lines 30 on the substrate 100A reach 98Ω to 102Ω, referring to FIG. 3, in some examples, a spacing S1 between the first data line 301 and the second data line 302 in the bidirectional differential data lines 30 is approximately 10 μm, line widths of the first data line 301 and the second data line are both approximately 4.95 μm, and thicknesses T1 of the first data line 301 and the second data line 302 are both approximately 1.8 μm. The term "approximately" may mean that a deviation of ±0.05 μm is allowed. For example, the spacing S1 may range from 9.95 μm to 10.05 μm, the line width may range from 4.9 μm to 5 μm, and the thickness T1 may range from 1.75 μm to 1.85 μm.

In addition, cross sections of the first data line 301 and the second data line 302 may each have any shape, which is not limited in the embodiments of the present disclosure. For example, referring to FIG. 3, with the second data line 302 as an example, a cross section of the second data line 302 in a direction perpendicular to the substrate 100A may have a trapezoidal shape. In this case, for example, a width W1 of an end face of the second data line 302 proximate to the substrate 100A may be 5 μm, and a width W2 of an end face of the second data line 302 away from the substrate 100A may be 4.9 μm. Here, the first data line 301 may be in a same shape and of a same size as the second data line 302.

A material of the substrate 100A may be glass, and materials of the first data line 301 and the second data line 302 may be metal, such as copper or copper alloy.

A thickness of the substrate 100A may be approximately 3 μm. For example, the thickness of the substrate 100A may range from 2.8 μm to 3.2 μm, inclusive. A dielectric constant of the substrate 100A may be approximately 3.4. For example, the dielectric constant of the substrate 100A may range from 3.2 to 3.6, inclusive.

It is worth pointing out that, in a possible case, glass is selected as the material of the substrate 100A, and the thickness of the substrate 100A is 3 μm; the materials of the first data line 301 and the second data line 302 in the bidirectional differential data lines 30 are both copper, the spacing S1 between the first data line 301 and the second data line 302 is 10 μm, the thicknesses T1 of the first data line 301 and the second data line 302 are both 1.8 μm, the cross sections of the first data line 301 and the second data line 302 in the direction perpendicular to the substrate 100A both have a trapezoidal shape, widths W1 of end faces of the first data line 301 and the second data line 302 proximate to the substrate 100A are 5 μm, and widths W2 of end faces of the first data line 301 and the second data line 302 away from the substrate 100A are 4.9 μm. In this case, it is verified through experiments that the characteristic impedance of the bidirectional differential data lines 30 on the substrate 100A is 101.81Ω, which meets the design requirement. In another possible case, the thickness of the substrate 100A is adjusted from 3 μm to 2.8 μm. In this case, it is verified through experiments that the characteristic impedance of the bidirectional differential data lines 30 on the substrate 100A is 98.31Ω, which also meets the design requirement. Therefore, the above technical solutions may make the bidirectional differential data lines 30 have good data transmission effects.

In some embodiments, referring to FIG. 1, the main control chip 10 includes M main control units 101, the camera system includes M groups of cameras 20 in one-to-one correspondence with the M main control units 101, and each group of cameras includes N cameras 20. M is an integer greater than or equal to 2, and N is an integer greater than or equal to 2.

The M main control units 101 may be numbered according to a certain rule. For example, in the example shown in FIG. 1, the M main control units 101 may be sequentially set as a first main control unit 101, a second main control unit 101, . . . , and an Mth main control unit 101 in a direction from left to right.

The M groups of cameras 20 may also be numbered according to a certain rule. For example, in the example shown in FIG. 1, the M groups of cameras 20 may be sequentially set as a first group of cameras 20, a second group of cameras 20, . . . , and an Mth group of cameras 20 in the direction from left to right.

The N cameras 20 in each group of cameras 20 may also be numbered according to a certain rule. For example, in the example shown in FIG. 1, all cameras 20 in each group of cameras 20 may be sequentially set as a first camera 20, a second camera 20, . . . , and an Nth camera 20 in a direction from top to bottom.

It will be noted that, the above merely illustrates one numbering sequence of the main control units 101 and one numbering sequence of the cameras 20, which, however, is not limited in the embodiments of the present disclosure. That is, in practical applications, a person skilled in the art may also adopt other numbering sequences.

In addition, the numbering of the main control units 101 and the cameras 20 may be realized by hardware, and may also be realized by software.

For the first to Nth cameras 20 in each group of cameras 20, in some examples, the numbers of the cameras may be fixedly set through pulling up and pulling down of pins in hardware. For example, for binary encoding, the number 0 corresponds to pulling down of a pin, and the number 1 corresponds to pulling up of a pin. In this case, if there are three pins, the numbers of eight cameras 20 may be determined, i.e., 000, 001, 010, 100, 011, 110, 101, and 111. In some other examples, the numbers of the cameras 20 may be defined by different firmware in hardware.

For all the main control units 101, numbers of the main control units 101 may also be fixedly defined directly by firmware in hardware. For example, a physical interface of each pair of bidirectional differential data lines may fixedly correspond to a number of a main control unit 101.

The firmware may be a field programmable gate array (FPGA) chip, or may be an application specific integrated circuit (ASIC) chip.

In some embodiments of the present disclosure, the main control chip 10 may be a FPGA chip or an ASIC chip. The image acquisition control chip 201 may be another FPGA chip or another ASIC chip.

In some embodiments, referring to FIG. 1, the first group of cameras 20 in the M groups of cameras 20 is connected to the first main control unit 101 in the M main control units 101 through a pair of bidirectional differential data lines 30, the second group of cameras 20 in the M groups of cameras 20 is connected to the second main control unit 101 in the M main control units 101 through another pair of bidirectional differential data lines 30, . . . , and the M group of cameras 20 in the M group of cameras 20 is connected to the Mth main control unit 101 in the M main control units 101 through yet another pair of bidirectional differential data lines 30. In other words, in this case, all groups of cameras 20 and the corresponding main control units 101 are connected in a star topology, so that M star topology networks processed in parallel may be formed, and control and data acquisition of N×M cameras may be realized.

Each camera 20 has an identifiable identification number. In some examples, the M main control units 101 are sequentially numbered as 1 to M, and cameras 20 in a group connected to each main control unit 101 are sequentially numbered as 1 to N. The identification number of each camera may be determined by combining the number of a respective main control unit 101 and the number of the camera 20. For example, an identification number of a first camera 20 in the first group of cameras 20 connected to the first main unit 101 is 11, and an identification number of an Nth camera in the first group of cameras 20 connected to the first main unit 101 is 1 N; an identification number of a first camera 20 in the second group of cameras 20 connected to the second main unit 101 is 21, and an identification number of an Nth camera 20 in the second group of cameras 20 connected to the second main unit 101 is 2 N; and so on, and an identification number of a first camera 20 in the Mth group of cameras 20 connected to the Mth main control unit 101 is M1, and an identification number of an Nth camera 20 in the Mth group of cameras 20 connected to the Mth main control unit 101 is MN. In this way, each main control unit 101 may separately perform information interaction with any camera 20 in the group of cameras 20 connected to the main control unit 101.

The main control chip 10 is a central control and a task initiation point of all star topology networks. For example, each main control unit is an active sending terminal (abbreviated as a master endpoint), each camera is a passive receiving terminal (abbreviated as a slave endpoint), and each slave endpoint is in a receiving state most of time. In each star topology network, only when a certain slave endpoint is accessed by the master endpoint, will the slave endpoint send corresponding response information. At this time, other slave endpoints in the star topology network are still in the receiving state, and only process information related to themselves and filter other information. In this way, a plurality of cameras in each star topology network will not be in the sending or receiving state at a same time.

In some embodiments, referring to FIG. 1, the M groups of cameras 20 are arranged in a first direction X, and the N cameras 20 in each group of cameras 20 are arranged in a second direction Y intersecting the first direction X. With such an arrangement, a large number of cameras 20 may be placed in a unit area. In this case, using each main control unit 101 to control and acquire data of the group of cameras 20 connected to the main control unit 101 is beneficial to obtaining an image with a high resolution.

For example, the second direction Y may be substantially perpendicular to the first direction X. Here, the description of "the second direction Y being substantially perpendicular to the first direction X", for example, may mean that an included angle between the two directions may range from 80 degrees to 100 degrees, inclusive.

In some embodiments, as shown in FIG. 1, the main control chip 10 further includes a second memory 102 and a peripheral interface 103. The second memory 102 is coupled to the at least one main control unit 101, and the peripheral interface 103 is coupled to the second memory 102. With such a design, the second memory 102 may be used to realize storage of image data acquired by each camera. Moreover, the peripheral interface 103 may be used to realize information interaction with an external device. For example, the image data stored in the second memory 102 may be transmitted to the external device.

Figure 4:
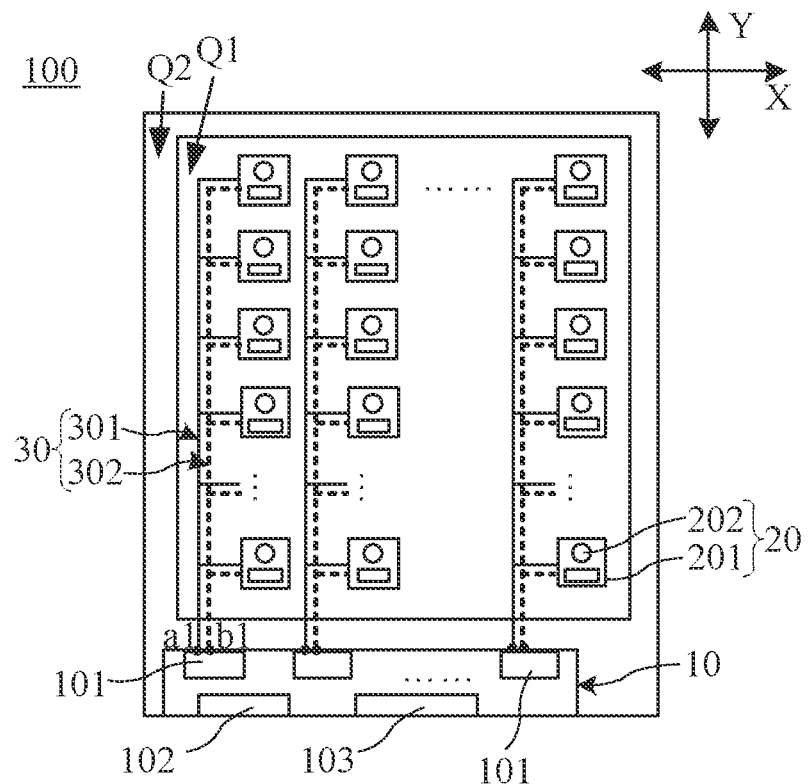
FIG. 4 is a structural diagram of a display screen, in accordance with some embodiments.

FIG. 4 is a structural diagram of a display screen in accordance with some embodiments. As shown in FIG. 4, the display screen 100 has a display area Q1 and a non-display area Q2 located on at least one side of the display area Q1. The non-display area Q2 may be disposed on only one side of the display area Q1, or may be disposed on two or more sides of the display area Q1. For example, FIG. 4 shows an example in which the non-display area Q2 surrounds the display area Q1.

The display screen 100 includes the camera system in any of the above embodiments. As shown in FIG. 4, the main control chip 10 in the camera system is located in the non-display area Q2, and the at least one group of cameras 20 in the camera system is located in the display area Q1. Such an arrangement is beneficial to arranging a large number of cameras 20 in the display area Q1 of the display screen 100. That is, it is beneficial to increasing an arrangement density of the cameras 20 in the display area Q1. In turn, the light field imaging may be performed by combining image information acquired by at least part of the cameras 20 to improve an imaging effect.

The display screen 100 may include a display panel and a circuit substrate under the display panel, and the cameras 20 may be integrated at a position of the circuit substrate corresponding to the display area Q1. When the cameras 20 are used for imaging, the display panel is configured to be in a transparent state at least at a position corresponding to the cameras 20, so that the cameras 20 may acquire external light to realize an imaging function. When the cameras 20 are not used for imaging, the display panel may be directly used to realize image display. Therefore, in some examples, the display screen 100 may not only acquire an external image, but also display the acquired image using the display panel.

Some embodiments of the present disclosure provide an electronic device. The electronic device includes the camera system described in any of the above embodiments (e.g., the camera system 01 shown in FIG. 1). Alternatively, the electronic device includes the display screen described in any of the above embodiments (e.g., the display screen 100 shown in FIG. 4).

The electronic device may be a display device, which may be, for example, any component with a display function, such as a television (TV), a digital camera, a mobile phone, a watch, a tablet computer, a notebook computer, or a navigator.

Herein, it is worth pointing out that, in a case where the electronic device includes the camera system 01, the electronic device may or may not have a display screen. In a case where the electronic device has a display screen, the camera system 01 may be integrated in the display screen to form, for example, the display screen 100 shown in FIG. 4. Alternatively, the camera system 01 and the display screen may be provided separately, that is, the camera system 01 may be located at a position of the electronic device except a position within the display screen.

For beneficial effects of the electronic device, reference may be made to beneficial effects of the camera system 01 and the display screen 100 described in the above embodiments, and details will not be repeated here.

Figure 5:
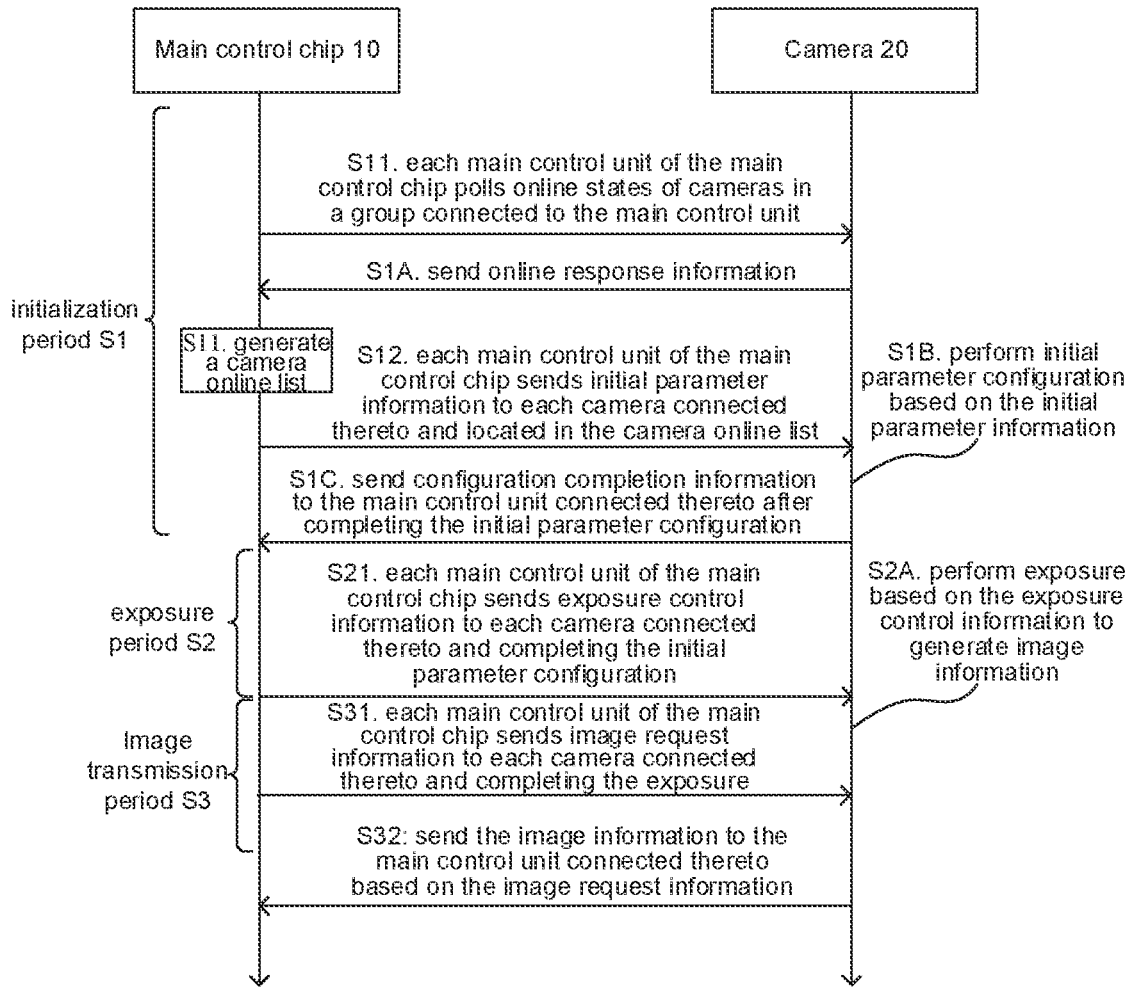
FIG. 5 is a flow diagram of a data transmission method, in accordance with some embodiments.

FIG. 5 is a flow diagram of a data transmission method in accordance with some embodiments. Referring to FIG. 5, some embodiments of the present disclosure provide a data transmission method, which may be applied to the camera system 01 described in any of the above embodiments.

As shown in FIG. 5, the data transmission method includes an initialization period S1, an exposure period S2 and an image transmission period S3. The data transmission method in some embodiments will be described below with reference to FIGS. 1 and 5.

In the initialization period S1:

In S11, each main control unit 101 of the main control chip 10 polls online states of cameras 20 in a group connected to the main control unit 101, and generates a camera online list. For example, each camera 20 may have an identifiable identification number. In this case, each main control unit 101 may sequentially poll the group of cameras 20 connected thereto according to a sequence of identification numbers. When a certain camera 20 is polled, if the camera 20 may work normally, the camera 20 performs S1A, which is sending online response information to the main control unit 101. After receiving the online response information sent by the camera 20, the main control unit 101 determines that the camera 20 may work normally, that is, the main control unit 101 determines that the camera 20 is located in the camera online list.

Through the above polling method, query of online states of all groups of cameras 20 may be completed, and a plurality of camera online lists may be established (here, each camera online list corresponds to a group of cameras 20). It can be understood that, the camera online list may include all cameras 20 in the group of cameras 20, or may include only a part of the cameras 20 in the group of cameras 20.

In S12, each main control unit 101 of the main control chip 10 sends initial parameter information to cameras 20 connected to the main control unit 101 and located in the camera online list. The initial parameter information includes relevant parameters that need to be configured on the camera 20 according to usage scenarios, such as aperture size, shutter speed, and sensitivity.

The camera 20 in the camera online list performs S1B, which is performing initial parameter configuration based on the initial parameter information, and performs S1C, which is sending configuration completion information to the main control unit 101 connected to the camera 20 after completing the initial parameter configuration.

The initialization period S1 is completed after that all the main control units 101 of the main control chip 10 each receive the configuration completion information sent by each camera 20 in the corresponding camera online list. Then, the exposure period S2 is started.

In the exposure period S2:

In S21, each main control unit 101 of the main control chip 10 sends exposure control information to each camera 20 connected to the main control unit 101 of the main control chip 10 and completing the initial parameter configuration. The exposure control information includes exposure time and the like.

In this case, each camera 20 that completes the initial parameter configuration and is located in the camera online list is configured to perform S2A, which is performing exposure based on the exposure control information to generate image information. In some examples, the camera 20 includes a first memory (e.g., the first memory 2012 shown in FIG. 2). In this case, the camera 20 may store image information generated by itself in the first memory 2012 of the camera 20.

In the image transmission period S3:

In S31, each main control unit 101 of the main control chip 10 sends image request information to each camera 10 connected to the main control unit 101 and completing the exposure.

In S32, each camera 20 completing the exposure and located in the camera online list sends the image information to the main control unit 101 connected thereto based on the image request information. In this way, the main control chip 10 may obtain image information of all cameras completing the exposure and located in the camera online list. Then, the main control chip 10 may store the image information of all the camera 20 through the second memory included in the main control chip 10 (e.g., the second memory 102 shown in FIG. 1). Alternatively, the main control chip 10 may transmit the image information of all the cameras 20 to the external device through the peripheral interface included in the main control chip 10 (e.g., the peripheral interface 103 shown in FIG. 1). In some examples, the main control chip 10 may also process the image information of all the cameras 20 to integrate and generate a complete image. In this case, for example, the main control chip 10 may also store the generated complete image in the second memory 102, or transmit the generated complete image to the external device through the peripheral interface 103.

In some embodiments, sending the initial parameter information includes: sending a camera parameter configuration data packet including the initial parameter information. For example, format of the camera parameter configuration data packet may be shown in Table 1.

TABLE 1

| Synchronization information | Package type | Main control unit number | Camera number | Data area | Check |
|---|---|---|---|---|---|
| 0x01 | 0x0D | 0x00 to 0xFF | 0x00 to 0xFF | Camera parameters (several bytes) | CRC16 |

Sending the configuration completion information includes: sending a camera configuration response data packet including the configuration completion information. For example, format of the camera configuration response data packet may be shown in Table 2.

TABLE 2

| Synchronization information | Package type | Slave ID | Master ID | Data area | Check |
|---|---|---|---|---|---|
| 0x01 | 0x02 | 0x00 to 0xFF | 0x00 to 0xFF | Response information (0x01 or others) | CRC16 |

Sending the exposure control information includes: sending a broadcast exposure data packet including the exposure control information. For example, format of the broadcast exposure data packet may be shown in Table 3.

TABLE 3

| Synchronization information | Package type | Master ID | Broadcast ID | Data area | Check |
|---|---|---|---|---|---|
| 0x01 | 0xFF | 0x00 to 0xFF | 0xFF | Exposure parameters (e.g., exposure time) | CRC16 |

Sending the image request information includes: sending an image information request data packet including the image request information. For example, format of the image information request data packet may be shown in Table 4.

TABLE 4

| Synchronization information | Package type | Main ID | Dependent ID | Data area | Check |
|---|---|---|---|---|---|
| 0x01 | 0x01 | 0x00 to 0xFF | 0x00 to 0xFF | Image transmission request information (0x01, etc.) | CRC16 |

Sending the image information includes: sending an image information transmission data packet including the image information. For example, format of the image information transmission data packet may be shown in Table 5.

TABLE 5

| Synchronization information | Package type | Slave ID | Master ID | Package number | Data area | Check |
|---|---|---|---|---|---|---|
| 0x01 | 0x03 | 0x00 to 0xFF | 0x00 to 0xFF | 0x0000 to 0xFFFF | Image information (0 Bytes to 1024 Bytes) | CRC16 |

At least one of the camera parameter configuration data packet, the camera configuration response data packet, the broadcast exposure data packet, the image information request data packet and the image information transmission data packet is sent after being encoded. For example, any one of the above data packets may be encoded in a non-return-zero inverted (NRZI) encoding manner, and then the encoded data packet is sent.

Figure 6:
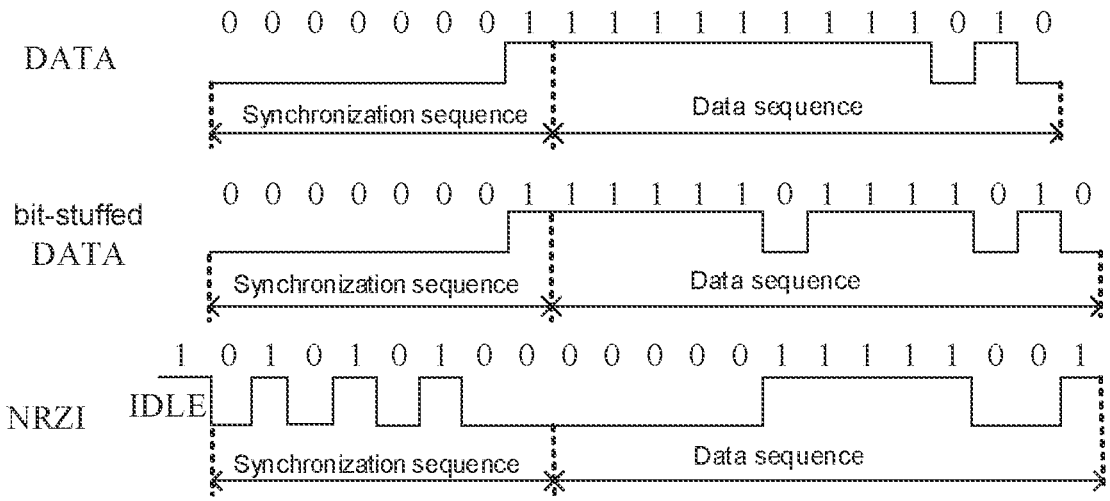
FIG. 6 is a timing diagram of a non-return-zero inverted (NRZI) code, in accordance with some embodiments.

In the NRZI encoding manner, in order to ensure accuracy of signal transmission, it is necessary to perform a bit-insertion operation before sending a data packet. For example, as shown in FIG. 6, a 0 is inserted after every six consecutive 1s in a data stream DATA to obtain a bit-stuffed DATA sequence. During decoding, the inserted bits need to be removed.

After obtaining the bit-stuffed DATA sequence, differential data on a data line is input as '0', which indicates that the signal level is inverted, and the differential data on the data line is input as '1', which indicates that the signal level is unchanged. As a result, the NRZI sequence, for example, shown in FIG. 6 is obtained. In FIG. 6, an IDLE signal is "1", and the "1" is inverted to "0" that is in the NRZI sequence when encountering the first "0" in the bit-stuffed DATA sequence, and then a bit is not inverted when encountering "1". By analogy, the bit-stuffed DATA sequence in FIG. 6 may be converted into the NRZI sequence, thereby realizing the NRZI encoding.

In the process of realizing decoding, the above DATA sequence may be obtained by inversely inferring according to the above manner.

In addition, it will be noted that, in some examples, at least one of the above data packets (e.g., the camera parameter configuration data packet, the camera configuration response data packet, the broadcast exposure data packet, the image information request data packet and the image information transmission data packet) includes synchronization information. For example, the above synchronization information 0x01 (referring to FIG. 6, the synchronization sequence is the synchronization information 0x01) enables each receiving terminal to recover the working clock of the sending terminal according to the NRZI encoded data stream.

Figure 7:
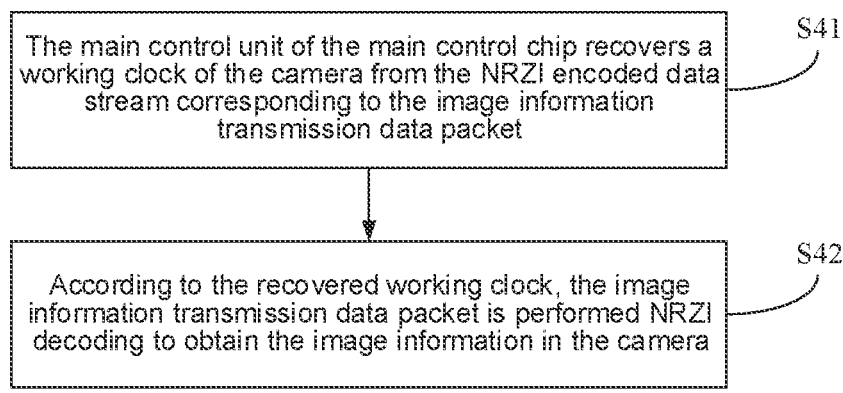
FIG. 7 is a flow diagram of another data transmission method, in accordance with some embodiments.

Based on this, in some embodiments, referring to FIG. 7, the data transmission method further includes S41 and S42.

In S41, a working clock of the camera 20 is recovered by the main control unit of the main control chip 10 from the NRZI encoded data stream corresponding to the image information transmission data packet.

In S42, according to the recovered working clock, the image information transmission data packet is performed NRZI decoding to obtain the image information in the camera 20.

In some embodiments described above, the information interaction between each main control unit 101 and the corresponding group of cameras 20 may be achieved by setting only a pair of bidirectional differential data lines without separately setting a clock signal line. As a result, the number of wire harnesses is reduced, which is conducive to arranging a large number of cameras 20 in a unit area, and in turns conducive to improving resolution of the acquired image.

Figure 8:
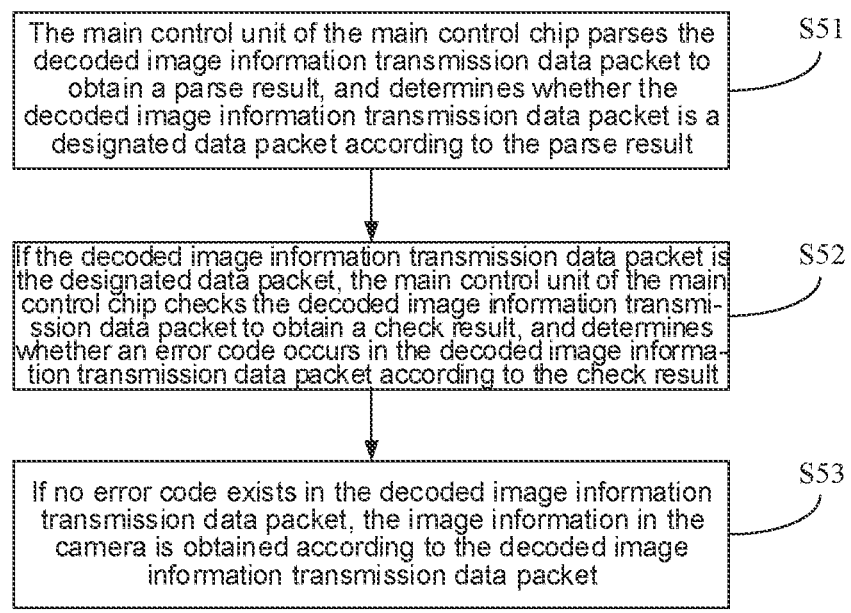
FIG. 8 is a flow diagram of yet another data transmission method, in accordance with some embodiments.

On this basis, for example, as shown in FIG. 8, the data transmission method further includes S51 to S53.

In S51, the main control unit of the main control chip parses the decoded image information transmission data packet to obtain a parse result, and determines whether the decoded image information transmission data packet is a designated data packet according to the parse result. Here, if the image information transmission data packet is the designated data packet, it means that this data packet is the data packet ought to be sent to the main control unit, and then the main control unit may further process the data packet; if the image information transmission data packet is not the designated data packet, it means that this data packet is not the data packet ought to be sent to the main control unit, and the main control unit does not need to process the data packet. With such an arrangement, the pair of bidirectional differential data lines connected to the main control unit and all the image acquisition control chips in the group of cameras is used to achieve data packet transmission, which is beneficial to improve accuracy of data packet transmission.

In S52, if the decoded image information transmission data packet is the designated data packet, the main control unit of the main control chip checks the decoded image information transmission data packet to obtain a check result, and determines whether an error code occurs in the decoded image information transmission data packet according to the check result. Here, if there is the error code, it means that the received image information transmission data packet is incomplete, and/or there is error information in the image information transmission data packet, then the main control unit may discard this data packet and re-send the image information request data packet to its corresponding camera. If there is no error code, it means that the received image information transmission data packet is complete, and there is no error information in the image information transmission data packet, then the S53 may be performed. In S53, if no error code exists in the decoded image information transmission data packet, the image information in the camera is obtained according to the decoded image information transmission data packet.

The manner of checking the image information transmission data packet may be a cyclic redundancy check (CRC) manner.

The data transmission method provided by the embodiments of the present disclosure is introduced through the above method examples. Based on this, some embodiments of the present disclosure further provide a main control chip 10 and a camera 20. In order to achieve above functions, the main control chip 10 and the camera 20 each may include corresponding hardware structures and/or software modules for performing the functions. Those skilled in the art may easily realize that the present disclosure may be implemented in hardware or in a combination of hardware and computer software with reference to method steps of the examples described in the embodiments disclosed herein. Whether a certain function is performed by hardware or computer software driving hardware depends on specific application and design constraints of the technical solution. Professionals may implement the described functions by using different methods on various specific applications, but such implementations should not be considered beyond the scope of the present disclosure.

The main control chip 10 and the camera 20 provided by the embodiments of the present disclosure may be divided into functional modules according to the above method examples. For example, the main control chip 10 and the camera 20 each may be divided into functional modules according to functions. Alternatively, two or more functions may be integrated into one processing module. The integrated module may be implemented in a form of hardware or in a form of software functional module. It will be noted that, the division of modules in the embodiments of the present disclosure is schematic, which is merely a logical function division, and there may be other division manners in actual implementation.

Figure 9:
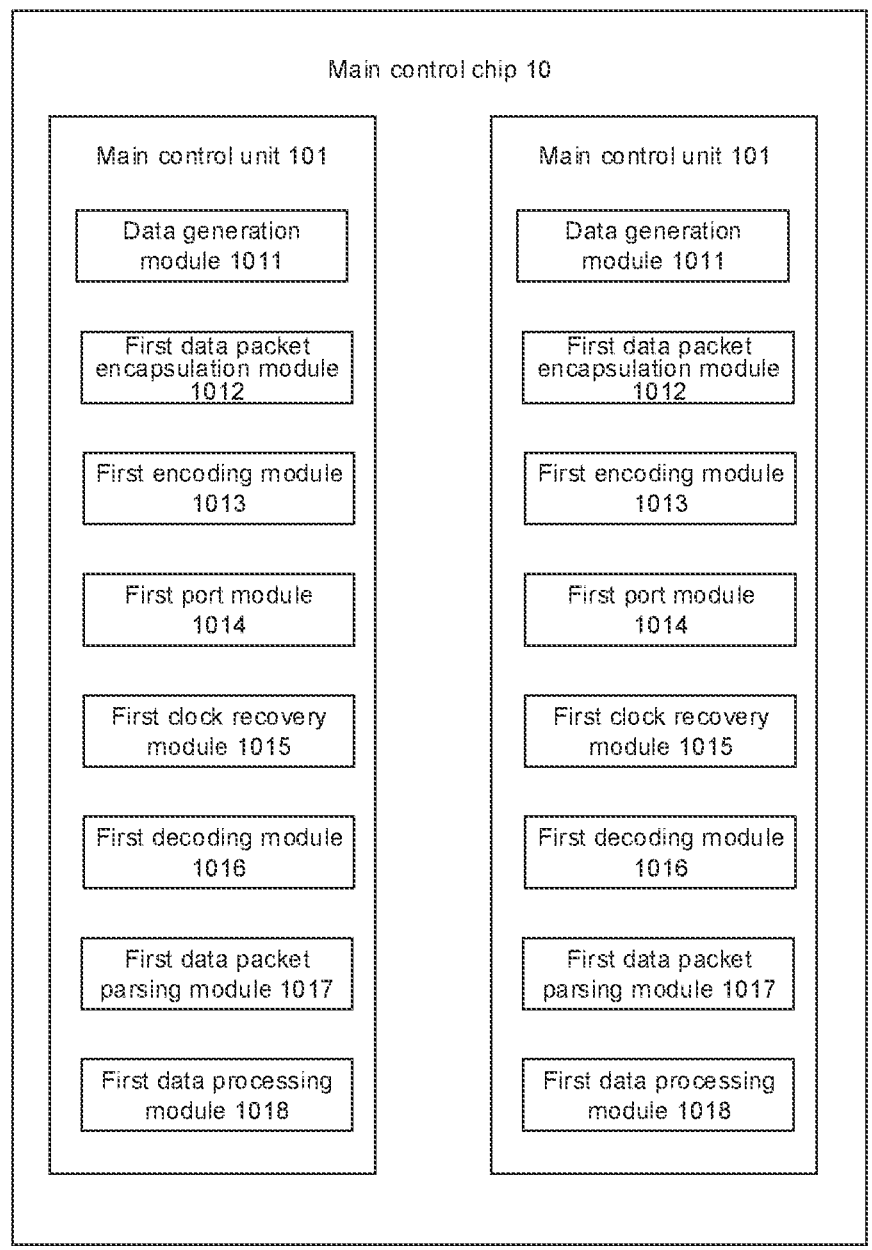
FIG. 9 is a structural diagram of a main control chip, in accordance with some embodiments.

In a case where the main control chip 10 is divided into the functional modules according to the functions, FIG. 9 shows a possible structural schematic diagram of the main control chip 10 involved in some of the above embodiments. As shown in FIG. 9, the main control chip 10 includes at least one main control unit 101, and the main control unit 101 includes a data generation module 1011, a first data packet encapsulation module 1012, a first encoding module 1013, a first port module 1014, a first clock recovery module 1015, a first decoding module 1016, a first data packet parsing module 1017 and a first data processing module 1018.

The data generation module 1011 is configured to generate at least one of initial parameter information, exposure control information and image request information.

The first data packet encapsulation module 1012 is configured to perform at least one of: forming the camera parameter configuration data packet by encapsulation according to the initial parameter information, forming the broadcast exposure data packet by encapsulation according to the exposure control information, or forming the image information request data packet by encapsulation according to the image request information. For example, the first data packet encapsulation module 1012 may perform encapsulation according to the above data packet format (including synchronization information, packet type, master ID, slave ID, CRC check), so as to obtain the at least one of the camera parameter configuration data packet, the broadcast exposure data packet and the image information request data packet as described above.

The first encoding module 1013 is configured to encode at least one of the camera parameter configuration data packet, the broadcast exposure data packet and the image information request data packet. For example, the first encoding module 1013 may encode the at least one of the camera parameter configuration data packet, the broadcast exposure data packet and the image information request data packet in the NRZI encoding manner.

The first port module 1014 is configured to send at least one of an encoded camera parameter configuration data packet, an encoded broadcast exposure data packet, and an encoded image information request data packet to at least one camera of the camera system, and receive an encoded camera configuration response data packet and/or an encoded image information transmission data packet sent by the at least one camera of the camera system. For example, the first port module 1014 may perform parallel-to-serial conversion (converting parallel data into serial data) on the encoded data stream corresponding to the data packet, and then send the data stream. In addition, after receiving the serial data corresponding to the data packet from the camera 20, the first port module 1014 may perform high-speed serial-to-parallel conversion (converting the serial data into parallel data).

The first clock recovery module 1015 is configured to recover a first working clock of the camera from the encoded data stream sent by the camera. For example, the first clock recovery module 1014 may sample the serial data through a high-speed sampling clock, obtain transmission rate of the sending terminal (i.e., the camera), and recover the first working clock.

The first decoding module 1016 is configured to decode the encoded camera configuration response data packet and/or the encoded image information transmission data packet according to the recovered first working clock. For example, the first decoding module 1016 may perform NRZI decoding on the encoded camera configuration response data packet and/or the encoded image information transmission data packet according to the recovered first working clock.

The first data packet parsing module 1017 is configured to parse the decoded camera configuration response data packet and/or the decoded image information transmission data packet, so as to determine whether the decoded camera configuration response data packet is a designated data packet, and/or whether the decoded image information transmission data packet is a designated data packet. For example, the first data packet parsing module 1017 may perform parsing according to the type and ID number of each data packet, so as to determine whether each data packet is the designated data packet. Here, the designated data packet is a data packet that should be received by the main control unit.

The first data processing module 1018 is configured to perform check (e.g., CRC check) on the designated data packet(s) (e.g., the decoded camera configuration response data packet and/or the decoded image information transmission data packet) to obtain check result(s), and process the designated data packet(s) according to the check result(s). For example, according to the check result, it may be determined whether an error code occurs in the designated data packet. If there is the error code, it means that the received data packet is incomplete, and/or there is error information in the data packet. Then, the first data processing module 1018 may discard the data packet request its corresponding camera to resend a data packet, so as to obtain a data packet without an error code.

If there is no error code, it means that the received designated data packet is complete, and there is no error information in the designated data packet, then the first data processing module 1018 may respond to data in the designated data packet. For example, in a case where the designated data packet is the decoded camera configuration response data packet (the camera configuration response data packet including configuration status information, namely configuration completion information or configuration failure information), the first data processing module 1018 may obtain the configuration status information of the camera from the decoded camera configuration response data packet, and the first data processing module may also respond according to the configuration status information (e.g., perform a next operation when receiving the configuration completion information, or resend an initial parameter information to configure the camera when receiving the configuration failure information). For another example, in a case where the designated data packet is the decoded image information transmission data packet, the first data processing module 1018 may obtain the image information in the camera from the decoded image information transmission data packet.

On this basis, for example, the main control unit 101 may further include a first cache module. The first cache module may be used to perform local cache acquired image information in the camera.

In some embodiments, in addition to the above main control unit 101, the main control chip 10 may further include at least one of the forgoing peripheral interface 103 and the forgoing second memory 102. For beneficial effects of the peripheral interface 103 and the second memory 102, details will not be detailed here.

Figure 10:
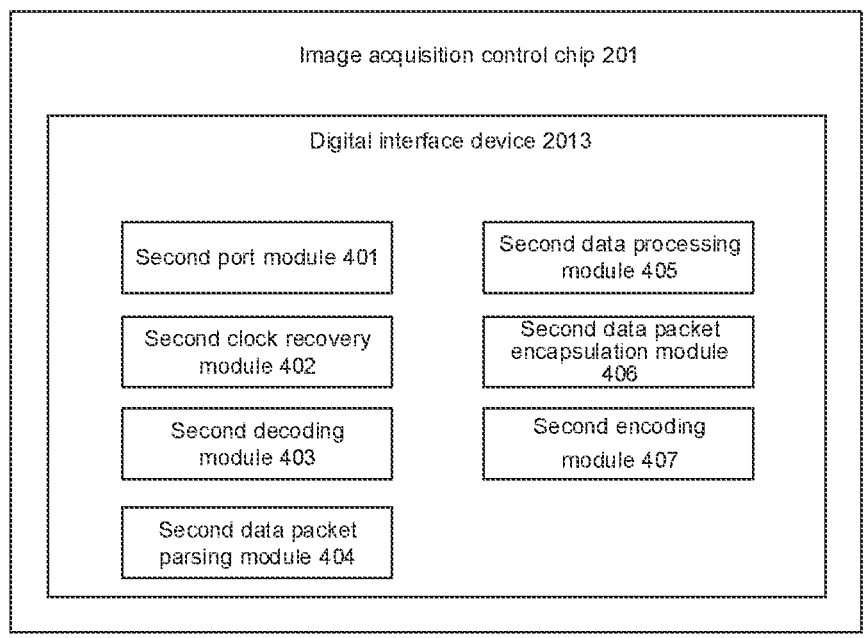
FIG. 10 is a structural diagram of a camera, in accordance with some embodiments.

FIG. 10 shows a possible structural schematic diagram of the camera 20 involved in some of the above embodiments. As shown in FIG. 10, the image acquisition control chip 201 of the camera 20 includes the digital interface device 2013, and the digital interface device 2013 includes a second port module 401, a second clock recovery module 402, a second decoding module 403, a second data packet parsing module 404, a second data processing module 405, a second data packet encapsulation module 406 and a second encoding module 407.

The second port module 401 is configured to receive, sent by the main control unit, at least one of the encoded camera parameter configuration data packet, the encoded broadcast exposure data packet and the encoded image information request data packet. For example, a high-speed serial-to-parallel conversion (converting the serial data into the parallel data) may be performed when the serial data corresponding to the data packet is received from the main control unit.

The second clock recovery module 402 is configured to recover a second working clock of the main control unit from the encoded data stream sent by the main control unit. For example, the second clock recovery module 402 may sample the serial data through the high-speed sampling clock, obtain transmission rate of the sending terminal (i.e., the main control unit), and recover the second working clock.

The second decoding module 403 is configured to, according to the recovered second working clock, decode at least one of the encoded camera parameter configuration data packet, the encoded broadcast exposure data packet and the encoded image information request data packet. For example, the second decoding module 403 may, according to the recovered second working clock, perform NRZI decoding on the at least one of the encoded camera parameter configuration data packet, the encoded broadcast exposure data packet and the encoded image information request data packet by NRZI decoding.

The second data packet parsing module 404 is configured to parse at least one of the decoded camera parameter configuration data packet, the decoded broadcast exposure data packet and the decoded image information request data packet, so as to determine whether at least one of the decoded camera parameter configuration data packet, the decoded broadcast exposure data packet and the decoded image information request data packet is a respective designated data packet. For example, the second data packet parsing module 404 may perform parsing according to the type and ID number of each data packet, so as to determine whether each data packet is the designated data packet. Here, the designated data packet is a data packet that should be received by the camera.

The second data processing module 405 is configured to check (e.g., CRC check) at least one of the designated data packets (e.g., the decoded camera parameter configuration data packet, the decoded broadcast exposure data packet, and the decoded image information request data packet) to obtain a check result, process the designated data packet according to the check result, and generate configuration status information (e.g., the configuration completion information or the configuration failure information) and/or read image information.

According to the check result, it may be determined whether there is an error code in the designated data packet. If there is the error code, it means that the received data packet is incomplete, and/or there is error information in the data packet, then, the second data processing module 405 may discard the data packet and request the main control unit to resend a data packet (e.g., generate the configuration failure information), so as to obtain a data packet without an error code.

If there is no error code, it means that the received designated data packet is complete, and there is no error information in the designated data packet, then the second data processing module 405 may respond to data in the designated data packet (e.g., generate the configuration completion information, or read image information). In a case where the designated data packet is the decoded camera parameter configuration data packet, the second data processing module 405 may generate the configuration completion information. In a case where the designated data packet is the decoded image information request data packet, the second data processing module 405 may read the image information.

The second data packet encapsulation module 406 is configured to generate a camera configuration response data packet by encapsulation according to the configuration status information (the configuration completion information or the configuration failure information) and/or generate an image information transmission data packet by encapsulation according to the image information. For example, the second data packet encapsulation module 406 may perform encapsulation according to the above data packet format (including synchronization information, packet type, master ID, slave ID, CRC check), so as to obtain the above camera configuration response data packet and/or the image information transmission data packet.

The second encoding module 407 is configured to encode the camera configuration response data packet and/or the image information transmission data packet. For example, the second encoding module 407 may perform NRZI encoding on the camera configuration response data packet and/or the image information transmission data packet.

The second port module 401 is further configured to send the encoded camera configuration response data packet and/or the encoded image information transmission data packet to the main control unit connected to the camera in the camera system. For example, the second port module 401 may perform parallel-to-serial conversion (converting the parallel data into the serial data) on the encoded data stream corresponding to the data packet, and then send the conversed encoded data stream.

On this basis, for example, the camera 20 may further include the forgoing lens 202. The image acquisition control chip 201 in the camera 20 may further include the forgoing analog acquirer 2011, the first memory 2012, the clock device 2014, the power management device 2015, and the first pin a to the fourth pin d.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A camera system, comprising:
    a main control chip, the main control chip including at least one main control unit;
    at least one group of cameras, each camera in each group of cameras including an image acquisition control chip; and
    at least one pair of bidirectional differential data lines, each pair of bidirectional differential data lines being connected to a single main control unit and all image acquisition control chips in a single group of cameras, wherein the image acquisition control chip includes a first pin and a second pin;
    each main control unit includes another first pin and another second pin; and
    each pair of bidirectional differential data lines includes:
    a first data line connected to a first pin of the single main control unit and first pins of all the image acquisition control chips in the single group of the cameras corresponding to the main control unit; and
    a second data line connected to a second pin of the single main control unit and second pins of all the image acquisition control chips in the single group of the cameras corresponding to the main control unit.

2. The camera system according to claim 1, wherein the camera further includes a lens; and the image acquisition control chip further includes:
    an analog acquirer located on a light-exit side of the lens, the analog acquirer being configured to acquire an analog image signal corresponding to the lens, and convert the analog image signal into a digital image signal;
    a first memory coupled to the analog acquirer, the first memory being configured to store the digital image signal; and
    a digital interface device and a clock device;
    the digital interface device being coupled to the analog acquirer, the first memory, the clock device, and both the first pin and the second pin of the image acquisition control chip; and
    the clock device being configured to provide working clocks for the analog acquirer, the first memory and the digital interface device.

3. The camera system according to claim 2, wherein the image acquisition control chip further includes:
    a third pin configured to be connected to an external power supply;
    a fourth pin being grounded; and
    a power management device coupled to the third pin and the fourth pin, the power management device is configured to provide a working power for the analog acquirer, the first memory, the digital interface device and the clock device.

4. The camera system according to claim 1, further comprising:
    a substrate on which the at least one pair of bidirectional differential data lines is laid, wherein
    characteristic impedance of each pair of bidirectional differential data lines on the substrate is in a range from 98Ω to 102Ω, inclusive.

5. The camera system according to claim 1, wherein the main control chip includes M main control units, the camera system comprises M groups of cameras in one-to-one correspondence with the M main control units, and each group of cameras includes N cameras, wherein
    M is an integer greater than or equal to 2, and N is an integer greater than or equal to 2.

6. The camera system according to claim 5, wherein the M groups of cameras are arranged in a first direction, and the N cameras in each group of cameras are arranged in a second direction intersecting the first direction; and/or
    the M main control units are sequentially numbered as 1 to M, cameras in a group connected to each main control unit are sequentially numbered as 1 to N, and an identification number of each camera is a combination of numbers of a respective main control unit and the camera.

7. The camera system according to claim 1, wherein the main control chip is a field programmable gate array (FPGA) chip or an application specific integrated circuit (ASIC) chip; and
    the image acquisition control chip is another FPGA chip or another ASIC chip.

8. The camera system according to claim 1, wherein the main control chip further includes:
    a second memory coupled to the at least one main control unit; and
    a peripheral interface coupled to the second memory.

9. A display screen having a display area and a non-display area located on at least one side of the display area, the display screen comprising:
    the camera system according to claim 1, wherein
    the main control chip in the camera system is located in the non-display area, and the at least one group of cameras in the camera system is located in the display area.

10. An electronic device, comprising the display screen according to claim 9.

11. An electronic device, comprising the camera system according to claim 1.

12. A data transmission method applied to the camera system according to claim 1, the method comprising:
    in an initialization period:
    polling, by each main control unit of the main control chip, online states of cameras in a group connected thereto to generate a camera online list;
    sending, by each main control unit of the main control chip, initial parameter information to each camera connected thereto and located in the camera online list;
    performing, by each camera in the camera online list, initial parameter configuration according to the initial parameter information, and
    sending, by each camera in the camera online list, configuration completion information to a main control unit connected thereto after completion of the initial parameter configuration;

in an exposure period:
sending, by each main control unit of the main control chip, exposure control information to each camera connected thereto and completing the initial parameter configuration; and
performing, by each camera completing the initial parameter configuration and located in the camera online list, exposure based on the exposure control information, so as to generate image information; and in an image transmission period:
sending, by each main control unit of the main control chip, image request information to each camera connected thereto and completing the exposure; and
sending, by each camera completing the exposure and located in the camera online list, the image information to the main control unit connected thereto based on the image request information.

13. The method according to claim 12, wherein sending the initial parameter information includes: sending a camera parameter configuration data packet including the initial parameter information;
sending the configuration completion information includes: sending a camera configuration response data packet including the configuration completion information;
sending the exposure control information includes: sending a broadcast exposure data packet including the exposure control information;
sending the image request information includes: sending an image information request data packet including the image request information; and
sending the image information includes: sending an image information transmission data packet including the image information, wherein
at least one of the camera parameter configuration data packet, the camera configuration response data packet, the broadcast exposure data packet, the image information request data packet or the image information transmission data packet is sent after being encoded.

14. The method according to claim 13, wherein the at least one of the camera parameter configuration data packet, the camera configuration response data packet, the broadcast exposure data packet, the image information request data packet or the image information transmission data packet is sent after being encoded in a non-return-zero inverted (NRZI) encoding manner.

15. The method according to claim 13, wherein the at least one of the camera parameter configuration data packet, the camera configuration response data packet, the broadcast exposure data packet, the image information request data packet or the image information transmission data packet includes synchronization information.

16. The method according to claim 13, further comprising:
recovering, by each main control unit of the main control chip, a working clock of the camera sending the image information from an encoded data stream corresponding to the image information transmission data packet; and
decoding, by each main control unit of the main control chip, the image information transmission data packet to obtain the image information in the camera according to the recovered working clock.

17. The method according to claim 16, wherein decoding the mace information transmission data packet to obtain the image information in the camera includes:
parsing, by the main control unit of the main control chip, the decoded image information transmission data packet to obtain a parsed result;
determining, by the main control unit of the main control chip, whether the decoded image information transmission data packet is a designated data packet according to the parsed result;
if the decoded image information transmission data packet is the designated data packet, checking, by the main control unit of the main control chip, the decoded image information transmission data packet to obtain a check result, and determining, by the main control unit of the main control chip, whether an error code occurs in the decoded image information transmission data packet according to the check result; and
if no error code occurs in the decoded image information transmission data packet, obtaining, by the main control unit of the main control chip, the image information in the camera according to the decoded image information transmission data packet.

18. The camera system according to claim 1, wherein each main control unit is configured to:
poll online states of cameras in a group connected to the main control chip to generate a camera online list;
send initial parameter information to each camera connected to the main control chip and located in the camera online list;
receive configuration completion information sent by each camera in the camera online list;
send exposure control information to each camera connected to the main control chip and completing initial parameter configuration;
send image request information to each camera connected to the main control chip and completing exposure; and
receive image information sent by each camera completing the exposure and located in the camera online list.

19. The camera system according to claim 1, wherein an image acquisition control chip of a camera is configured to:
receive initial parameter information sent by a main control unit connected to the camera;
perform initial parameter configuration according to the initial parameter information;
send configuration completion information to the main control unit connected to the camera after completion of the initial parameter configuration;
receive exposure control information sent by the main control unit connected to the camera;
perform exposure based on the exposure control information to generate image information;
receive image request information sent by the main control unit connected to the camera; and
send the image information to the main control unit connected to the camera based on the image request information.

* * * * *

UNITED STATES PATENT AND TRADEMARK OFFICE
CERTIFICATE OF CORRECTION

PATENT NO. : 11,991,460 B2  
APPLICATION NO. : 17/911150  
DATED : May 21, 2024  
INVENTOR(S) : Yangbing Li et al.

Page 1 of 1

It is certified that error appears in the above-identified patent and that said Letters Patent is hereby corrected as shown below:

In the Claims

Column 24 (Claim 17), Line 4: "mace" should be "image".

Signed and Sealed this  
Fourth Day of February, 2025

Coke Morgan Stewart  
*Acting Director of the United States Patent and Trademark Office*